(12) United States Patent
Brun et al.

(10) Patent No.: US 8,529,827 B1
(45) Date of Patent: Sep. 10, 2013

(54) HIGH STRENGTH, FINE GRAINED SPINEL FOR WINDOW APPLICATIONS, METHODS OF MANUFACTURE THEREOF AND ARTICLES COMPRISING THE SAME

(75) Inventors: Milivoj Konstantin Brun, Ballston Lake, NY (US); Anteneh Kebbede, Schenectady, NY (US); Sean Michael Sweeney, Schenectady, NY (US); Timothy James Yosenick, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/533,147

(22) Filed: Jun. 26, 2012

Related U.S. Application Data

(62) Division of application No. 12/265,868, filed on Nov. 6, 2008, now Pat. No. 8,268,286.

(51) Int. Cl.
*C04B 33/32* (2006.01)

(52) U.S. Cl.
USPC .......................................................... 264/663

(58) Field of Classification Search
USPC ........................................ 264/604, 663, 667
See application file for complete search history.

(56) References Cited

U.S. PATENT DOCUMENTS

| | | | |
|---|---|---|---|
| 4,930,731 A | 6/1990 | Roy et al. | |
| 5,089,196 A * | 2/1992 | Itoh et al. | 264/658 |
| 5,152,940 A | 10/1992 | Shibata et al. | |
| 8,211,356 B1 * | 7/2012 | Hartnett et al. | 264/663 |
| 2004/0266605 A1 | 12/2004 | Villalobos et al. | |
| 2005/0020432 A1 * | 1/2005 | Roy et al. | 501/98.2 |
| 2010/0056357 A1 * | 3/2010 | Loutfy et al. | 501/109 |

OTHER PUBLICATIONS

G. Gilde et al., "A Comparison of Hot-Pressing, Rate-Controlled Sintering, and Microwave Sintering of Magnesium Aluminate Spinel for Optical Applications," SPIE Conference on Window and Dome Technologies and Materials VI, vol. 3705, pp. 94-104, Apr. 1999.
K. Rozenburg et al., "Sintering Kinetics of a MgAl2O4 Spinel Doped with LiF," Journal of the American Ceramics Society, vol. 91, No. 2, pp. 444-450, Feb. 2008.
J. Voyles, "Spinel and Optical Ceramics—Properties," Technology Assessment & Transfer, Inc., 2 pages, http://www.techassess.com/tech/spinel/spinel_prop.htm, Feb. 23, 2009.
K. Morita et al., "Fabrication of transparent MgAl2O4 spinel polycrystal by spark plasma sintering processing," Science Direct, Scripta Materialia, vol. 58, pp. 1114-1117, Feb. 14, 2008.

* cited by examiner

*Primary Examiner* — Joseph S Del Sole
*Assistant Examiner* — Erin Snelting
(74) *Attorney, Agent, or Firm* — Paul J. DiConza

(57) ABSTRACT

Disclosed herein is a spinel article. The article includes a spinel material, wherein the spinel material has a monomodal grain size distribution with average grain sizes of less than or equal to about 15 micrometers, and a biaxial flexural strength of greater than or equal to about 300 megapascals when measured by a ring-on-ring flexural test as per ASTM Standard C1499-08. Disclosed herein too is a method for manufacturing a spinel article, including calcining a spinel powder; milling the powder in a milling medium; granulating the powder; screening the powder to a mesh size of about 40 to about 200 mesh; pressing the powder to form an article; burning out organics from the article; sintering the article; and hot isostatically pressing the article.

18 Claims, 5 Drawing Sheets

HIGH STRENGTH, FINE GRAINED SPINEL FOR WINDOW APPLICATIONS, METHODS OF MANUFACTURE THEREOF AND ARTICLES COMPRISING THE SAME

RELATED APPLICATIONS

This application is a divisional of U.S. patent application Ser. No. 12/265,868, filed 6 Nov. 2008, which is herein incorporated by reference.

STATEMENT REGARDING FEDERALLY SPONSORED RESEARCH & DEVELOPMENT

The U.S. Government has certain rights in this invention pursuant to the US Army TACOM grant No. W56 HZV-05-C-0517.

BACKGROUND

This disclosure relates to high strength fine-grained spinel for window applications, methods of manufacture thereof and to articles comprising the same.

High strength, high hardness, transparent materials with low optical scatter are needed for transparent armor such as Humvee windows, and as infrared windows for missile radomes. Currently ballistic glass bonded to plastic is being used for transparent armor while single crystal $Al_2O_3$ (sapphire) is being used as a missile dome material. Ballistic glass suffers with issues related to its hardness and ballistic stopping power per unit of weight. Sapphire domes are expensive since there is a substantial amount of machining required of the single crystal boule to make suitable dome shapes. It is therefore desirable to find a material other than glass and sapphire that can be used.

BRIEF DESCRIPTION OF THE INVENTION

Disclosed herein is a spinel article. The article comprises a spinel material, wherein the spinel material has a monomodal grain size distribution with average grain sizes of less than or equal to about 15 micrometers, and a biaxial flexural strength of greater than or equal to about 300 megapascals when measured by a ring-on-ring flexural test as per ASTM Standard C1499-08.

Disclosed herein too is a spinel article manufactured by a method comprising calcining a spinel powder; milling the powder in a milling medium; granulating the powder; screening the powder to a mesh size of about 40 to about 200 mesh; pressing the powder to form an article; burning out organics from the article; sintering the article; and hot isostatically pressing the article.

Disclosed herein too is a method comprising calcining a spinel powder; milling the powder in a milling medium; granulating the powder; screening the powder through a mesh size of about 40 to about 200 mesh; pressing the powder to form an article; burning out organics from the article; sintering the article; and hot isostatically pressing the article.

DETAILED DESCRIPTION OF THE INVENTION

Disclosed herein is a spinel that has a monomodal grain size distribution with an average grain size of less than 15 micrometers, with a biaxial flexural strength (when measured by a ring-on-ring flexural test as per ASTM Standard C1499-08) of greater than or equal to about 300 megapascals (MPa) and with specular transmittance of greater than or equal to about 75% for wavelengths of 632 nanometers to 800 nanometers for a sample having a thickness of about 5 to about 10 millimeters. In an exemplary embodiment, the spinel has a specular transmittance of greater than or equal to about 80 percent (%) for wavelengths of 632 nanometers to 800 nanometers for a sample having a thickness of about 9.6 millimeters.

Spinel having a biaxial strength of greater than or equal to about 300 MPa and a specular transmittance of at least 80% allows for better performance of the spinel material as transparent armor and in radomes. Higher strength makes the material more capable of withstanding stresses in service, and high specular transmittance makes the material good for windows, giving a high signal to noise ratio of unscattered light to scattered light for a user/detector that is to be protected by the window. Spinel having a grain size of less than or equal to about 15 micrometers is easier to polish without grain pullout pitting when compared to a larger grained spinel, thus reducing polishing costs. In addition, biaxial strengths of greater than or equal to about 300 MPa make the material more robust as a window to withstand stresses during service. Spinel may be used in lieu of glass and sapphire in transparent armor when its specular transmittance of light having wavelengths of 632 nanometers (nm) to 800 nm can be increased to greater than or equal to about 80% for a part having a thickness of greater than or equal to about 9.6 millimeters.

The spinel can have a variety of different compositions. Examples of spinels are spinel ($MgAl_2O_4$), $MgGa_2O_4$, gahnite ($ZnAl_2O_4$), franklinite ($(Fe,Mn,Zn)(Fe,Mn)_2O_4$, chromite ($(Fe.Mg)Cr_2O_4$, magnetite ($Fe_3O_4$), hercynite ($FeAl_2O_4$), ulvöspinel ($TiFe_2O_4$), jacobsite ($MnFe_2O_4$), trevorite ($NiFe_2O_4$), ringwoodite ($SiMg_2O_4$), $ZnGa_2O_4$, $SiMg_2O_4$, or the like, or a combination comprising at least one of the foregoing spinels. In an exemplary embodiment, the spinel is $MgAl_2O_4$.

It is desirable for the spinels to be optically transparent. Examples of optically transparent spinels are $MgAl_2O_4$, $MgGa_2O_4$, $ZnAl_2O_4$, $ZnGa_2O_4$, $SiMg_2O_4$, or a combination comprising at least one of the foregoing spinels. In one embodiment, the spinels can be tinted if desired. A coloring or tinting agent comprising metal ions such as iron, manganese, chromium, cobalt, and the like, may be added to the spinel window.

Figure 1:
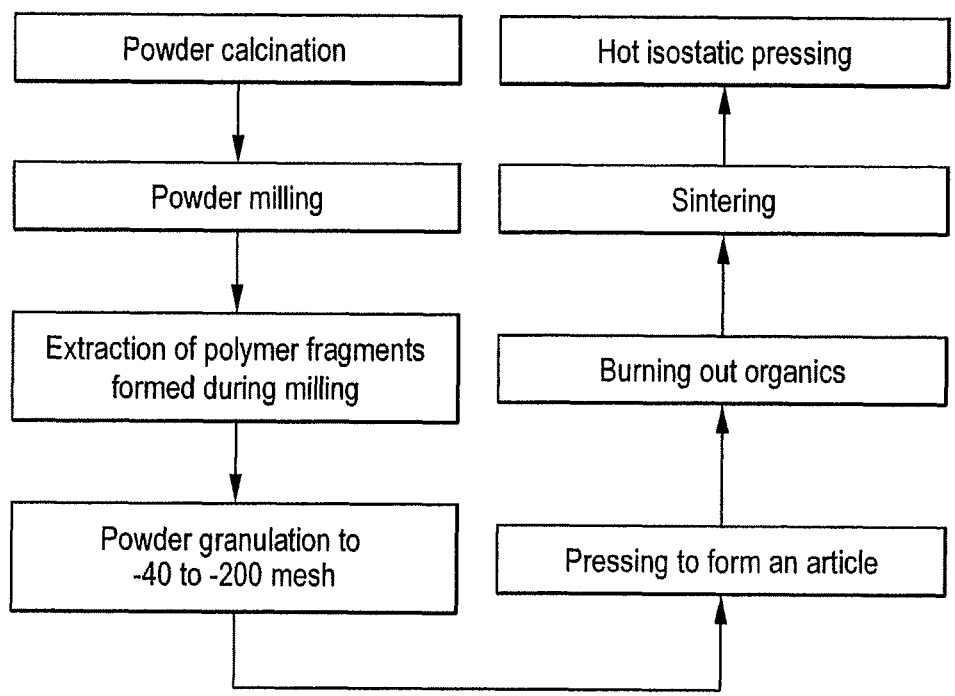
FIG. 1 is a depiction of the process for producing the spinel material disclosed herein.

FIG. 1 depicts an exemplary embodiment for manufacturing the spinel disclosed herein. The spinel is generally produced as a powder prior to starting the process to manufacture the dense body having the desired properties. The spinel powder may comprise small amounts of contaminants and trace amounts of other elements. In general it is desirable for the spinel powder to have metallic contaminants each of less than 5 parts per million (ppm) by weight. In one embodiment, it is desirable to have less than 2 ppm of any of the following elements: chromium, cobalt, nickel, copper, lead, titanium, vanadium and zinc. It is desirable for the spinel powder to have less than or equal to about 50 ppm of chlorine, less than or equal to about 50 ppm of sulfur, less than or equal to about 30 ppm of calcium, less than or equal to about 30 ppm of sodium, less than or equal to about 100 ppm silicon, less than or equal to about 12 ppm manganese, and less than or equal to about 30 ppm iron.

In an exemplary embodiment, it is desirable to have less than or equal to about 10 ppm of chlorine, less than or equal to about 20 ppm of sulfur, less than or equal to about 15 ppm calcium, less than or equal to about 15 ppm sodium less than or equal to about 10 ppm potassium; less than or equal to about 50 ppm silicon, less than or equal to about 6 ppm manganese and less than or equal to about 15 ppm iron.

The powder generally has a surface area of about 20 to about 60 square meters per gram ($m^2$/gm). In one embodiment, the powder has a surface area of about 30 to about 50 $m^2$/gm. In another embodiment, the powder has a surface area of about 35 to about 45 $m^2$/gm.

The average particle size of the powder is about 10 to about 200 nanometers (nm). In one embodiment, the average particle size of the powder is about 20 to about 150 nm. In another embodiment, the average particle size of the powder is about 30 to about 120 nm.

The powder is subjected to the process depicted in the FIG. 1. The powder is calcined to about 600 to about 900 degrees centigrade (° C.) to remove any residual organics that may be present in the powder following the production of the powder. In one embodiment, the powder is calcined to about 650 to about 850° C. In another embodiment, the powder is calcined to about 700 to about 800° C.

The powder is then subjected to milling and/or ultrasonication in order to reduce the particle sizes. Suitable examples of milling are ball milling, attrition milling, vibratory milling, jet milling, or a combination comprising at least one of the foregoing processes. Ball milling is an exemplary method by which the particle sizes are reduced. The milling is conducted in a milling medium for about 12 to about 48 hours. The milling medium comprises a liquid containing at least one of a dispersant, a binder, an optional plasticizer and a metal salt where the metal is from Group I of the periodic table. The liquid can contain combinations of the dispersant, the binder, the optional plasticizer and the metal salt where the metal is from Group I of the periodic table. In one embodiment, the milling medium comprises a liquid that comprises a dispersant, a binder, an optional plasticizer and a metal salt where the metal is from Group I of the periodic table.

The liquid can be an organic solvent or water. In one exemplary embodiment, the liquid is water. In another exemplary embodiment, the milling medium is in the form of a solution. In yet another exemplary embodiment, the milling medium is in the form of a suspension.

The dispersant can be an acid, a pre-neutralized acid, or a base. Examples of suitable acidic dispersants are carboxylic acids including citric acid, succinic acid, polyacrylic acid, acetic acid, or the like, or a combination comprising at least one of the foregoing acids. Examples of pre-neutralized acids are diammonium citrate, ammonium citrate tribasic, ammonium polyacrylate, ammonium acetate, or the like, or a combination comprising at least one of the foregoing pre-neutralized acids. Examples of suitable basic dispersants are ammonium hydroxide, tetramethyl ammonium hydroxide, or the like, or a combination comprising at least one of the foregoing bases.

The dispersant is added to the liquid in an amount of about 1 to about 5 weight percent (wt %), based on the total weight of the powder. In one embodiment, the dispersant is added to the liquid in an amount of about 2 to about 4 wt %, based on the total weight of the powder.

The binder can be an organic polymer. The organic polymer can be a thermoplastic polymer, a thermosetting polymer, a blend of thermoplastic polymers, a blend of thermosetting polymers or a blend of thermoplastic polymers with thermosetting polymers. The organic polymer can be a homopolymer, a copolymer, a star block copolymer, a block copolymer, a random copolymer, an alternating block copolymer, an ionomer, a dendrimer, a polyelectrolyte, or the like, or a combination comprising at least one of the foregoing copolymers. It is generally desirable for the organic polymer to be compatible with the liquid used for the milling. In one embodiment, it is desirable for the organic polymers to be water soluble.

Examples of suitable organic polymers that can be used as a binder are polyacrylamide, polyvinylalcohol, polyvinylpyrrolidone, polyethylene glycol, hydroxyethylcellulose, methylcellulose, polyethyleneimine, or the like, or a combination comprising at least one of the foregoing organic polymers.

The binder can be used in an amount of about 0.5 to about 5 wt %, based on the total weight of the powder. In one embodiment, the binder is present in the milling medium in an amount of about 1 to about 4 wt %, based on the total weight of the powder. In another embodiment, the binder is present in the milling medium in an amount of about 1.5 to about 3 wt %, based on the total weight of the powder.

As noted above, the milling medium comprises an optional plasticizer. It is generally desirable for the plasticizer to plasticize the organic polymer. Examples of suitable plasticizers are glycerin, ethylene glycol, tetraethylene glycol, dibutyl phthalate, or the like, or a combination comprising at least one of the foregoing plasticizers.

The plasticizer is generally used in an amount of about 0.1 to about 5 wt %, based on the total weight of the powder. In one embodiment the plasticizer is used in an amount of about 0.5 to about 4 wt %, based on the total weight of the powder. In another embodiment the plasticizer is used in an amount of about 1 to about 3 wt %, based on the total weight of the powder.

As noted above, the milling medium comprises a metal salt as a sintering aid. The metal in the metal salt is from Group I of the periodic table. Suitable metals from the Group I are lithium, sodium, potassium and cesium. Examples of suitable sintering aids are hydroxides, carbonates, oxalates, acetylacetonates, acetates and nitrates of lithium, cesium sodium or potassium. Combinations of the aforementioned sintering aids can also be used. The milling medium generally contains lithium in an amount of about 2 to about 100 parts per million, based on the total weight of the powder. In one embodiment, the milling medium generally contains lithium in an amount of about 5 to about 50 parts per million, based on the total weight of the powder. In an exemplary embodiment, the lithium is added in an amount of about 10 parts per million, based on the total weight of the powder.

The powder content in the milling medium is about 5 to about 30 volume percent. In one embodiment, the volume of the powder in the milling medium is about 12.5 to about 22.5 volume percent. In one embodiment, the volume of the powder in the milling medium is about 15 to about 20 volume percent.

Following the milling operation, any polymer particles that have been generated during the milling operation are extracted from the milling medium. The polymeric particles can be removed from the suspension by a process that includes centrifugation and skimming or separatory funneling, gravitational floatation and skimming, or separatory funneling, filtration, or the like, or a combination comprising at least one of the foregoing processes.

The dispersed powder in the milling medium is then subjected to granulation to produce a granulated powder. Granulation is generally conducted by a process including pan drying and crushing using a mortar and pestle, spray drying, freeze granulation, or the like, or a combination comprising at least one of the foregoing processes.

The granulated powder is then subjected to screening to obtain powders that have an average particle size of less than about 40 mesh to about 200 mesh. The granulated powder is generally sieved to obtain powders that have an average particle size of less than about 40 mesh to about 200 mesh. In one embodiment the powders after sieving have an average particle size of less than about 50 mesh to about 170 mesh. In another embodiment the powders after sieving have an average particle of less than about 60 mesh to about 120 mesh.

The granulated powder is then subjected to pressing using an isostatic pressure of about 140 megapascals (MPa) to about 420 MPa to form an article having a desired shape. In one embodiment, the granulated powder is subjected to a pressure of about 170 to about 350 MPa. In another embodiment, the granulated powder is subjected to a pressure of about 200 to about 300 MPa to form a desired article. The powder may be uniaxially pre-pressed in a die, and/or placed in a mold or a die prior to applying the isostatic pressure. In one embodiment, the article is a monolith.

Alternatively, in order to manufacture an article from the fine powder, processes such as slip casting, pressure filtration, gel casting, injection molding, freeze casting, extrusion, and tape casting followed by lamination can be used. Following the manufacturing of a desired article, the organic polymers and other organic binders are burned out of the article in an air and/or an oxygen atmosphere over the course of about 2 to about 7 days. The various parts of the desired article generally have a thickness of about 1 to about 18 millimeters. In one embodiment, the various parts of the desired article generally have a thickness of less than or equal to about 16 millimeters. In another embodiment, the various parts of the desired article generally have a thickness of less than or equal to about 14 millimeters.

The burned-out article is sintered to a temperature of about 1100° C. to about 1350° C. for a time period of about 0.5 hours to about 30 hours. The sintering is conducted under a vacuum or alternatively in the presence of wet hydrogen, dry hydrogen, or oxygen. Sintering results in a body with closed porosity prior to hot isostatically pressing, with a density in the range of about 94 to about 99.99% of the theoretical value that can be attained. The density value for the pore-free spinel is 3.58 grams per cubic centimeter. In one embodiment, the sintering produces a density of about 96 to about 99% of the theoretical value that can be attained. In one embodiment, the sintering produces a density of about 96.5 to about 97.5%, of the theoretical value that can be attained. An article with closed porosity can also be prepared by hot pressing or spark plasma sintering. Alternatively, an article with some open porosity can be directly hot isostatically pressed in a "can" material such as platinum or other refractory metal.

The article is then subjected to hot isostatic pressing. In one embodiment, the article is subjected to hot isostatic pressing to a temperature of about 1300° C. to about 1600° C. and a pressure of about 231.7 kilopascal to about 926.7 kilopascal. In another embodiment, the article is subjected to hot isostatic pressing to a temperature of about 1400° C. to about 1500° C. and a pressure of about 386.1 kilopascal to about 772.2 kilopascal.

The article is then subjected to polishing and tested. The biaxial flexural strength was measured by a ring-on-ring test method as prescribed by ASTM C1499-08. The samples have a diameter of 14 millimeters and have a thickness of 0.8 mm. The articles are supported by a 12.5 millimeter ring and loaded from the top with a 6.25 millimeter ring. That produces a state of uniform bi-axial tensile stress in the center part of the bottom surface of the sample, where the fracture originates.

Fracture in ceramics initiates from defects in the microstructure because stress is concentrated in those areas. Defects can be due to processing such as porosity, large grain agglomerates, or foreign material incorporated as a contaminant or they can be caused by sample preparation, such scratch marks produced during grinding. In the ring-on-ring test, the side of the sample that is in tension is normally polished to a mirror finish in order to minimize grinding defects.

The articles produced by the aforementioned method have advantageous properties. The articles have a monomodal grain size distribution with average grain sizes of less than or equal to about 15 micrometers. In one embodiment, the articles have a monomodal grain size distribution with average grain sizes of about 1 micrometer to about 15 micrometers. In another embodiment, the articles have a monomodal grain size distribution with average grain sizes of about 5 micrometers to about 10 micrometers. In yet another embodiment, the articles have a monomodal grain size distribution with average grain sizes of about 1 micrometer to about 5 micrometers.

They display a biaxial flexural strength of greater than or equal to about 300 MPa and display a specular transmittance of greater than or equal to about 75% between 632 and 800 nm wavelength for an article having a thickness of about 9.6 millimeter. This allows for better performance of the spinel material as transparent armor and in radomes. In one embodiment, the 9.6 millimeter thick spinel article displays a specular transmittance of greater than or equal to about 78%. In another embodiment, the 9.6 millimeter thick spinel article displays a specular transmittance of greater than or equal to about 80%. In yet another embodiment, the 9.6 millimeter thick spinel article displays a specular transmittance of greater than or equal to about 81.5%.

The spinel article displays a biaxial flexural strength of greater than or equal to about 300 MPa. In one embodiment, the spinel article displays a biaxial flexural strength of greater than or equal to about 350 MPa. In another embodiment, the spinel article displays a biaxial flexural strength of greater than or equal to about 400 MPa. In yet another embodiment, the spinel article displays a biaxial flexural strength of greater than or equal to about 480 MPa.

The following example illustrates methods and embodiments in accordance with the invention, and as such should not be construed as imposing limitations upon the claims. These examples demonstrate the manufacture of the spinel material described herein and demonstrate its performance compared with other spinets that are commercially available.

EXAMPLES

The example was conducted to demonstrate how the spinel disclosed herein is manufactured and tested.

Spinel powder having the composition $MgAl_2O_4$ and having a purity of greater than 99.98% was calcined in air at 700° C. for 3 hours. The powder was dispersed in a milling medium comprising 3 weight percent (with respect to the solid) of citric acid neutralized with ammonium hydroxide to a pH of 4 to 5. The powder was present in the milling medium in an amount of 15 volume percent. Lithium in an amount of 10 ppm, with respect to the powder weight, was added to the milling medium as a sintering aid. The lithium was added to the milling medium in the form of lithium hydroxide. Polyethylene glycol was added as a binder in an amount of 1.5 wt %, based on the weight of the powder.

The milling medium with the powder contained therein was subjected to ball milling. The ball milling was performed overnight for a total period of 15 hours. Polymeric particles formed during the milling were removed via filtration through a membrane. The membrane had an eight micrometer nominal pore size. The suspension was freeze granulated at the boiling temperature of liquid nitrogen. The resulting granulated powder was sieved through a 60 mesh sieve to produce the powder used in further processing. The granulated powder was first pressed uniaxially at approximately 21 MPa and then pressed isostatically at a pressure of approximately 280 MPa to produce an article of a desired shape. Several disc shaped samples (hereinafter "samples") were prepared in this manner.

The samples were burned out in an air/oxygen mixture over the course of 3 days to a temperature of 900° C. The heating profile to reach the temperature of 900° C. is as follows: the samples are heated at 1° C./min to 50° C. where they are held for 2 hours, 1° C./min to 170° C. (not held at 170° C. for any period of time), 0.2° C./min to 235° C. (not held at 235° C. for any period of time), 0.1° C./min to 270° C. (held at 270° C. for 5 hours), 0.1° C./min to 275° C. (held at 275° C. for 7 hours), 0.1° C./min to 350° C. (not held at 170° C. for any period of time), 0.8° C./min to 400° C. (held at 400° C. for one hour), 1° C./min to 600° C. (held at 600° C. for 1 hour), 2° C./min to 900° C. (held at 900° C. for 8 hours), 5° C./min to room temperature. The burned-out samples were sintered to 1260° C. for 3 hours and then hot isostatically pressed to 1450° C. in pressurized argon having a pressure of 695 kilopascal. Following the hot isostatic pressing and polishing, the samples had a final thickness of 9.6 millimeter.

Figure 2:
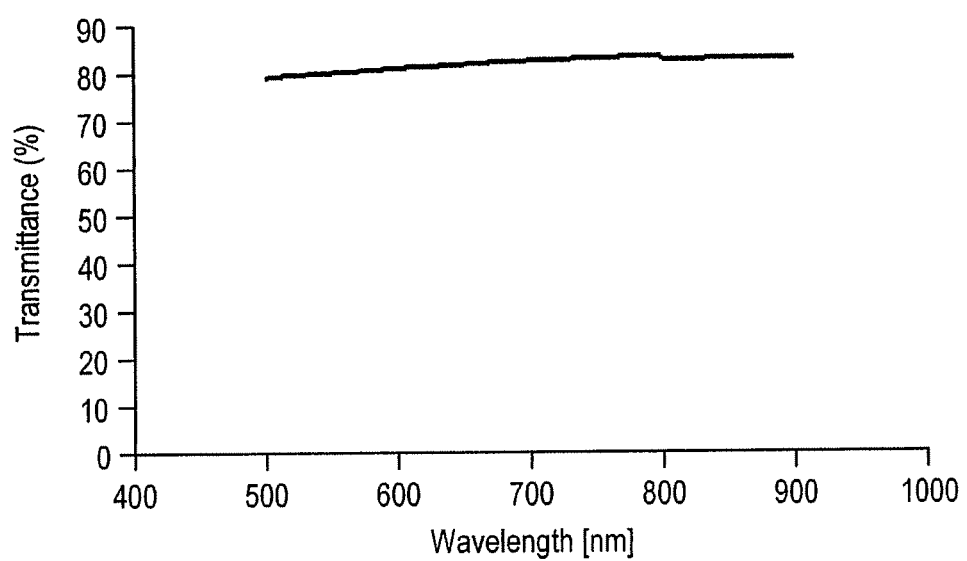
FIG. 2 is a graph showing the specular transmission in the wavelength range of 500 nanometers to 900 nanometers of a 9.6 millimeter thick spinel sample that was prepared in the Example disclosed herein.
Figure 3:
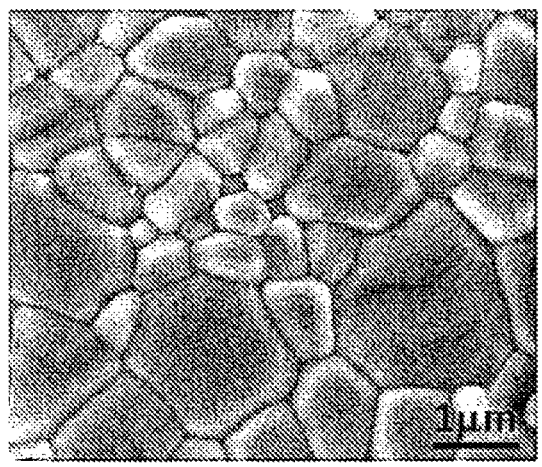
FIG. 3 is a scanning electron micrograph of the microstructure in the spinel material prepared in the Example disclosed herein.

FIG. 2 shows the specular transmittance of a 9.6 millimeter thick sample measured for electromagnetic radiation of wavelength in the 500 nanometers to 900 nanometers range. The sample exhibited a transmittance of 81.5% at 632 nanometers. One of the 9.6 millimeter thick discs was cut in half across the diameter and the cut section was then ground, polished, and thermally etched for microstructural characterization by scanning electron microscopy. FIG. 3 shows a scanning electron micrograph taken from a representative area of the disc. It can be seen that the spinel material has a unimodal grain size distribution with an average grain size in the range of 1 to 2 micrometers.

Figure 4:
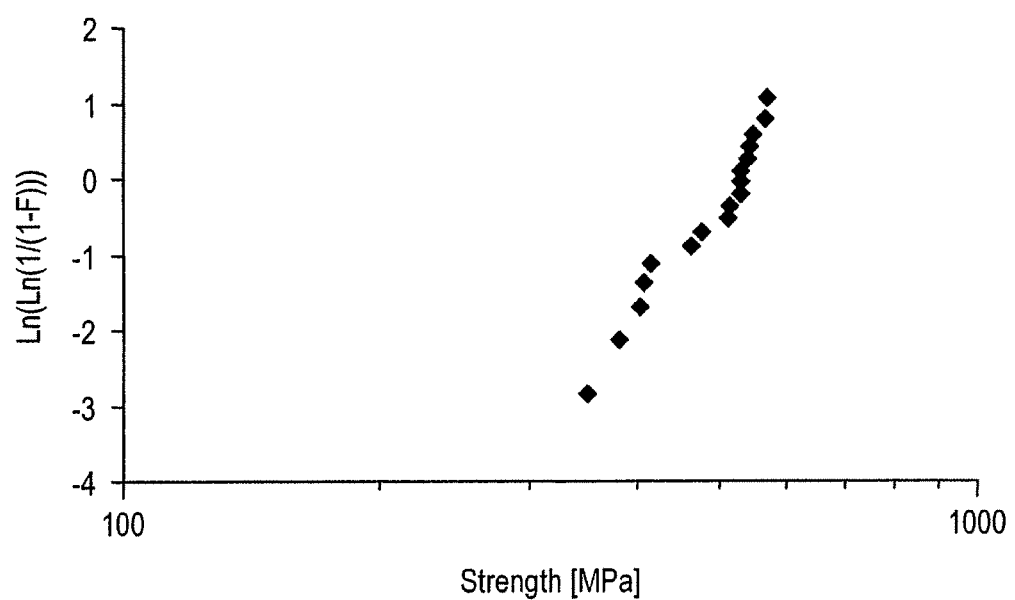
FIG. 4 is a Weibull plot of the biaxial flexural strength measured from spinel samples that were prepared in the Example disclosed herein.

Another 9.6 millimeter thick disc was cut up as follows to produce samples that were used to measure the strength of the spinel material using the ring-on-ring test. Several 14 millimeter diameter discs were cut out in a square form, then sliced to 1.5 to 2 millimeter thick pieces that were then glued together and turned to a cylindrical shape of 14 millimeter diameter. The glue was then removed and the discs were ground on both surfaces to reduce the thickness and improve the surface finish. All the discs were then polished on one side to a mirror finish with a final thickness of 0.8 millimeters. A total of 20 discs were subjected to the ring-on-ring test. FIG. 4 shows the Weibull plot of the flexural strength data measured from these samples. The average flexural strengths measured from these samples was 487 MPa.

Figure 5:
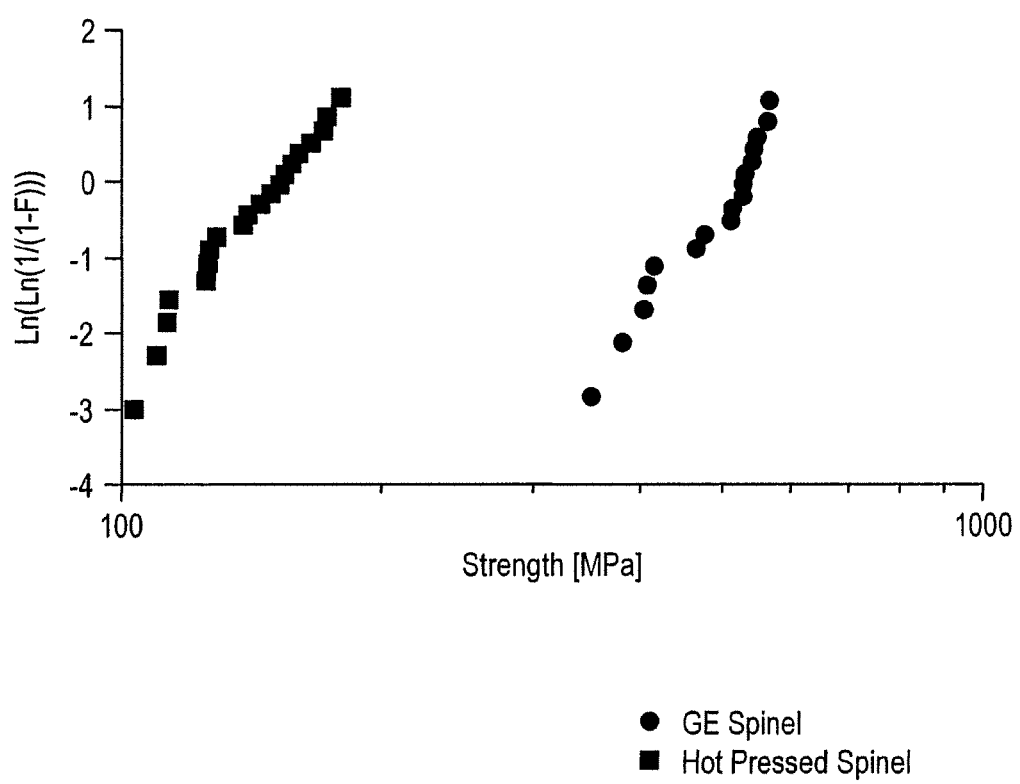
FIG. 5 shows a comparison of the biaxial strength measured from the spinel material disclosed herein with the biaxial strength measured from the state-of-the-art hot pressed spinel material acquired from a vendor.

The flexural strength measured in these samples was far superior when compared to what has been reported for various spinel materials in the literature. In order to validate this difference, a state-of-the-art spinel material that was prepared by hot pressing and hot isostatic pressing was acquired from a vendor. Disk samples for ring-on-ring flexural testing were prepared in the same manner as the newly disclosed material per the description above. It is to be noted that all of the flexural test samples used in the comparison were ground and polished by the same vendor using the same equipment and employing the same procedure for all samples. This is to be noted because surface flaws that are introduced during sample preparation could have a direct effect on the measured strength. The flexural strength data measured from the newly disclosed spinel samples is compared with what is measured from the vendor material samples in FIG. 5. The mean strength measured from the disclosed spinel samples was 487 MPa compared to a mean strength of 142 MPa measured for the vendor spinel samples. This result clearly illustrates that the disclosed material does offer a substantial strength improvement over state-of-the-art material.

The method of processing described herein ensures that there are essentially no voids. It facilitates the achieving of a density that is about 99.999 to about 99.99995 volume percent of the theoretical value of density that can be achieved for a spinel.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method comprising:
   calcining a spinel powder;
   milling the powder in a milling medium;
   filtering the powder to remove organic particles;
   granulating the powder;
   screening the powder to a mesh size of about 40 to about 200 mesh;
   pressing the powder to form an article;
   burning out organics from the article;
   sintering the article; and
   hot isostatically pressing the article to a temperature of about 1300° C. to about 1600° C. and a pressure of about 231.7 kilopascal to about 926.7 kilopascal.

2. The method of claim 1, wherein the calcining is conducted at a temperature of about 600° C. to about 900° C.

3. The method of claim 1, wherein the milling is accomplished via ball milling, attrition milling, vibratory milling and/or jet milling.

4. The method of claim 1, wherein the milling medium is a solution or a suspension.

5. The method of claim 4, wherein the solution comprises a liquid, a dispersant, a binder, an optional plasticizer and metal salt, where the metal is from Group I of the periodic table.

6. The method of claim 5, wherein the liquid is water or an organic solvent.

7. The method of claim 5, wherein the dispersant is an acid, a pre-neutralized acid or a base, and wherein the dispersant is added to the milling media in an amount of about 1 to about 5 weight percent, based upon the total weight of the powder.

8. The method of claim 7, wherein the acid is citric acid, succinic acid, polyacrylic acid, acetic acid or a combination comprising at least one of the foregoing acids.

9. The method of claim 7, wherein the pre-neutralized acid is diammonium citrate, ammonium citrate tribasic, ammonium polyacrylate, or a combination comprising at least one of the foregoing pre-neutralized acids.

10. The method of claim 7, wherein the base is ammonium hydroxide, tetramethyl ammonium hydroxide, or a combination comprising at least one of the foregoing bases.

11. The method of claim 5, wherein the binder is an organic polymer.

12. The method of claim 11, wherein the organic polymer is polyacrylamide, polyvinylalcohol, polyvinylpyrrolidone, polyethylene glycol, hydroxyethylcellulose, methylcellulose, polyethyleneimine, or a combination comprising at least one of the foregoing organic polymers.

13. The method of claim 5, wherein the binder is used in an amount of about 0.5 to about 5 weight percent, based upon the total weight of the powder.

14. The method of claim 5, wherein the plasticizer is glycerin, ethylene glycol, tetraethylene glycol, dibutyl phthalate, or a combination comprising at least one of the foregoing plasticizers and wherein the plasticizer is used in an amount of about 0.1 to about 5 wt %, based on the total weight of the powder.

15. The method of claim 5, wherein the metal salt is used as a sintering aid; the metal salt is nitrates, hydroxides, oxalates, carbonates, acetylacetonates, acetates of Group I metals or a combination thereof.

16. The method of claim 1, wherein the ratio of the powder to the milling medium is about 10 to about 25 volume percent.

17. The method of claim 1, wherein the pressing the powder to form an article is conducted using an isostatic pressure of about 140 megapascals to about 420 megapascals.

18. The method of claim 1, wherein the sintering of the article is conducted at a temperature of about 1200° C. to about 1350° C. for a time period of about 0.5 hours to about 24 hours.

* * * * *